United States Patent Office 3,479,390
Patented Nov. 18, 1969

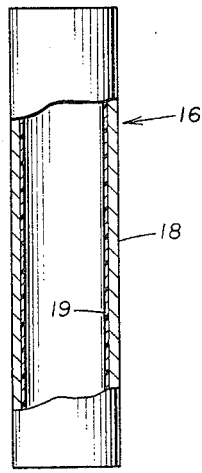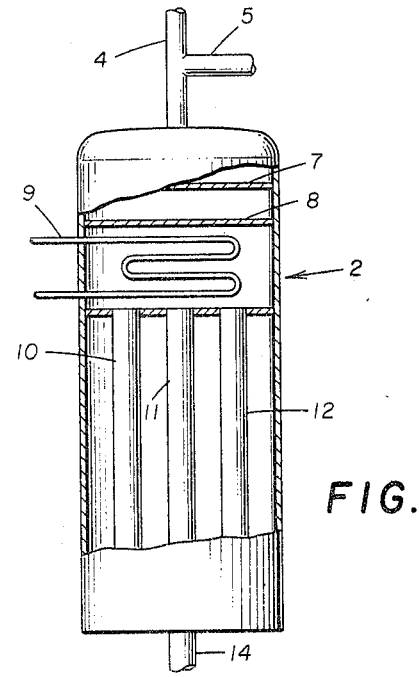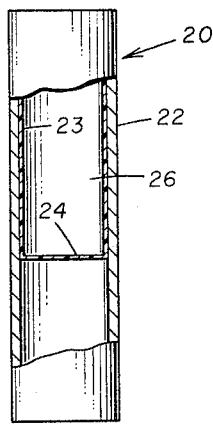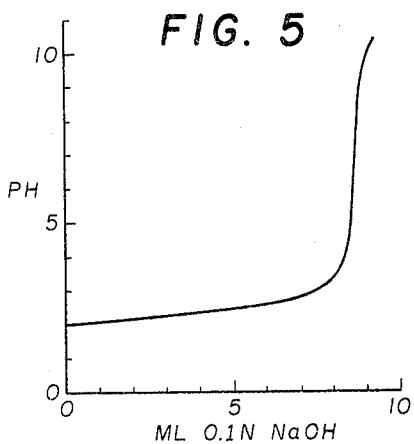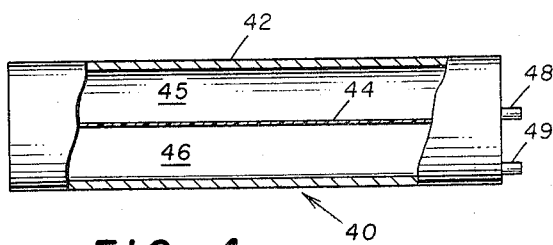

3,479,390
CATALYSIS OF AN ESTERIFICATION WITH A PERMEABLE MEMBRANE OF SULFONATED POLY(2,6-DIALKYLPHENOL)
Paul E. Blatz, Laramie, Wyo., and Sam R. Faris, Dallas, Tex., assignors to Mobil Oil Corporation, a corporation of New York
Filed Mar. 12, 1965, Ser. No. 439,397
Int. Cl. C07c 69/00, 69/14
U.S. Cl. 260—468
6 Claims This invention relates to the catalysis of chemical reactions and more particularly to the use of sulfonated poly (2,6-dialkyl phenol) as an acid catalyst in a chemical reaction.

Many chemical reactions are advantageously carried out in the presence of a catalyst which allows the reaction to proceed at lower conditions of temperature or pressure than would otherwise be possible or which tends to shift the equilibrium of the reaction in the direction of a desired product. Examples of such reactions are various commercial processes for the preparation of esters by the direct esterification of an acid with an alcohol. For example, acetic acid and methyl alcohol react when heated to form methyl acetate and water. The reaction is reversible but when carried out in the presence of an acid catalyst, the equilibrium point can be shifted to the right sufficiently to obtain a high yield of ester.

Numerous acids have been used in the catalysis of esterification and other chemical reactions. For example, sulfuric acid and to a lesser extent benzenesulfonic acid have been used extensively in the commercial productions of esters of saturated acids as described above. Various disadvantages are attendant to the use of these and other acids as catalysts. For example, sulfuric acid and benzene sulfonic acid often are soluble in the reactants and/or products of many chemical reactions, thus requiring that provisions be made for separating and recycling the catalysts. Of course, sulfuric acid also is highly corrosive and this presents additional problems in handling. In addition to liquid catalysts, solid bead-type catalysts have been used. However, like the liquid catalysts, bead-type catalysts have not proven to be entirely satisfactory.

In accordance with the present invention, there is provided a novel and improved method of carrying out a chemical reaction subject to catalysis by an acid by using as the catalyst a solid film of sulfonated poly (2,6-dialkyl phenol). In carrying out the invention, the reactants of the chemical reaction subject to catalysis by an acid are flowed either separately or in admixture into a passage defined at least in part by a solid film of sulfonated poly (2,6-dialkyl phenol). Enabling conditions for the chemical reaction are established within the passage such that the reaction proceeds when the reactants contact each other and the sulfonated poly (2,6-dialkyl phenol) film. At least one product of the reaction is withdrawn from the passage at a point downstream of the point at which the reactants are introduced.

In another aspect of the invention, there is provided a method for carrying out a chemical reaction subject to catalysis by an acid and in which at least one of the reactants and products of the reaction is characterized by a relatively high negative polarity. In this embodiment of the invention, the reactants are flowed into a reaction chamber which is defined at least in part by a permeable membrane of sulfonated poly (2,6-dialkyl phenol). Enabling conditions for the chemical reaction are established within the reaction chamber such that the reaction proceeds when the reactants are in contact with each other and with the membrane. A pressure gradient is established across the membrane from the interior of the reaction chamber to the exterior thereof such that at least one product or reactant of the reaction characterized by a relatively low or no negative polarity is selectively passed through the membrane. At least a portion of the reactant or product characterized by a relatively high negative polarity is selectively excluded from passage through the membrane, thus at least partial separation of the products and reactants is achieved.

For a better understanding of the invention, reference may be had to the following detailed description and accompanying drawings in which:
 FIGURE 1 is an illustration partly in section showing a container for use with the instant invention;
 FIGURE 2 is an illustration partly in section showing one form of a reaction vessel in which a chemical reaction may be carried out in accordance with the invention;
 FIGURE 3 is an illustration partly in section showing a modified form of reaction vessel;
 FIGURE 4 is an illustration partly in section showing another modified form of reaction vessel; and
 FIGURE 5 is an illustration showing a titration curve for a sulfonated poly (2,6-dialkyl phenol) film.

With reference to FIGURE 1, there is shown a container 2. The container includes means for mixing the reactants of the chemical reaction involved and means for heating the reactants to the enabling temperature of the reaction prior to passing the reactants into a number of reaction chambers. More particularly, and with reference to FIGURE 1, there are shown inlet lines 4 and 5 through which the reactants are introduced into container 2. The reactants pass through a series of perforated baffle plates 7 and 8 in order to insure that adequate mixing is achieved. The reactants then pass over a suitable heat exchange coil 9 and are brought to the desired temperature for the chemical reaction. The reactants then pass into a plurality of reaction vessels 10, 11, and 12 in which the reaction takes place. At least one product of the invention and possibly several products and unreacted reactants pass from the container by means of an outlet 14. This effluent then may be passed to suitable separation and purification zones in a manner well known in the art.

Turning now to FIGURE 2, there is shown one form of a reaction vessel. The reaction vessel 16 is formed by an outer shell 18 of steel or other suitable material which is lined by a film 19 of sulfonated poly (2,6-dialkyl phenol) which defines the chamber in which the chemical reaction takes place.

In carrying out the method of the instant invention, at least one and preferably a plurality of reaction vessels 16 are placed in a suitable container such as that shown in FIGURE 1. In this case, the reaction vessels 16 are indicated in FIGURE 1 by reference numerals 10, 11, and 12. Reactants then are introduced into the container. For example, in the production of methyl acetate from acetic acid and methyl alcohol, the acid and alcohol are introduced into the container through inlet lines 4 and 5, respectively. As will be understood by those skilled in the art, the methyl alcohol preferably will be in excess of the stoichiometric amount. As the reactants flow through the perforated baffle plates 7 and 8, they become mixed. The temperature of heating coil 9 is adjusted such that the reactants will be heated to a suitable temperature, e.g., about 130° F., before entering the reaction chambers. As the mixture of alcohol and acid flows through the reaction chambers, it is contacted by the sulfonated poly (2,6-dialkyl phenol) film lining the reaction chambers or passages so that the esterification reaction is catalyzed. The methyl acetate and water produced by the esterification reaction and the unreacted alcohol and acid are withdrawn from the passages at their downstream ends. The effluent from each of passages 10, 11, and 12 passes into suitable manifolding means (not shown) in the bottom of container 2 and thence through outlet 14. The fluid stream from outlet 14 then is directed to a suitable separation zone where the mixture of products and reactants is separated into its various components. This may be done, for example, by distillation. From the separation zone, the acetic acid and methyl alcohol may be recirculated to the reaction chambers.

In FIGURE 3, there is shown a reaction vessel which may be used when the chemical reaction which is to be catalyzed is characterized by at least on product or reactant which dissociates to an anionic state in the environment of the reaction and exhibits a relatively high negative polarity when compared with at least one other product or reactant. Preferably, the chemical reaction is one in which at least one of the reactants is characterized by a relatively high negative polarity. The phrase "relatively high negative polarity" is used in a comparative sense only. That is, a product or reactant of a chemical reaction is considered to have a relatively high negative polarity if at least one other product or reactant of the reaction in question exhibits less or no negative polarity.

With reference to FIGURE 3, the reaction vessel 20 is formed by an outer tubing 22 and an innner lining or film 23 of sulfonated poly (2,6-dialkyl phenol) as in the case of the reaction vessel of FIGURE 2. The reaction chamber shown in FIGURE 3 is further characterized by a permeable barrier comprising a permeable membrane 24 formed of sulfonated poly (2,6-dialkyl phenol). Like any permeable barrier, the membrane 24 will impede the passage of fluids through the reaction chamber and the flow rate through the membrane will depend upon factors such as the pressure gradient across the membrane from the upstream side thereof to the downstream side thereof. However, the membrane 24 also has conductant properties such that it will tend to selectively restrict the passage of a material having a relatively high negative polarity and selectively pass, i.e., impede to a lesser extent, the other less polar materials. For example, acetic acid has an ionization constant of about $1.8 \times 10^{-5}$ and exhibits a relatively high negative polarity when compared with methyl alcohol which is barely ionizable. In the esterification in reaction vessel 20 of acetic acid with methyl alcohol, membrane 24 will selectively restrict the passage of the acetic acid because of its relatively high negative polarity, and unreacted acetic acid will concentrate in the reaction chamber at the point indicated by reference numeral 26. However, the unreacted alcohol, and also the methyl acetate and water, will selectively pass through the membrane and be discharged at the downstream end of the reaction chamber. In this case, the purification of the effluent from the reaction chamber is simplified and less recirculation of the acetic acid is required. The reaction vessel 20 may be utilized in the container shown in FIGURE 1 similarly as in the case of the reaction vessel 16.

The invention as carried out in the reaction chamber of FIGURE 3 tends to behave like a batch-type process since the membrane 24 impedes fluid flow through the reaction chamber. In FIGURE 4 there is shown a reaction chamber for carrying out a reaction characterized by at least one reactant or product exhibiting a relatively high degree of negative polarity and which lends itself readily to a continuous type process.

More particularly and with reference to FIGURE 4, there is shown a reaction vessel 40 which comprises an outer shell 42 such as a steel tubing and an inner, longitudinally extending membrane 44 formed of sulfonated poly (2,6-dialkyl phenol). The membrane 44 is supported in the shell 40 by suitable support means (not shown) and cooperates with the outer shell to define an upper chamber 45 in which the reaction in question is carried out in a lower chamber 46.

In utilizing the structure of FIGURE 4, the reactants are introduced through one end of tube 40 into chamber 45 and the reaction takes place as they flow through the chamber and traverse the surface of the membrane 44. Membrane 44 will selectively restrict the passage of th fluid having a relatively high negative polarity while selectively passing the other less polar fluids into the lower chamber 46. The effluents from chambers 45 and 46 are withdrawn separately through outlets 48 and 49, respectively, and passed to suitable separation or disposal zones or recirculated as appropriate. For example, in the esterification reaction described above, the effluent from outlet 48 would be recirculated to chamber 45 whereas in a process in which membrane 44 selectively restricts the passage of a desired reaction product, the effluent from outlet 48 would be passed to a purification zone.

Departing temporarily from the description of the invention, the film catalyst and the polymer from which it is made will be described. The film catalyst is formed from a sulfonated poly (2,6-dialkyl phenol) having the following general formula:

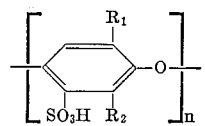

wherein $R_1$ and $R_2$ are methyl, ethyl, or n-propyl radicals and $n$ is the number of sulfonated dialkyl phenol units in the polymer.

The sulfonated poly (2,6-dialkyl phenol) from which the catalyst is formed may be prepared by any suitable method. A suitable procedure for preparing this polymer is described below, it being understood that the following description is exemplary only and that the polymer and the method by which it is prepared form no part of the present invention. Briefly, this procedure involves, as a first step, the polymerization of a dialkyl phenol monomer. In this first step, pyridine is added to a suitable solvent for the monomer, such as benzene or nitrobenzene. The pyridine acts as a ligand in the polymerization reaction. Cuprous chloride is also added to the solvent. These materials may be employed in the proportion of 90 milliliters of pyridine, 300 milliliters of solvent, and 0.4 gram of cuprous chloride. An oxygen-containing gas then is bubbled through the mixture to convert the cuprous chloride to cupric chloride. The cupric chloride reacts with the pyridine to form a complex which acts as a catalyst for the polymerization reaction. Thereafter, the monomeric 2,6-dialkyl phenol is added to the solution. The monomer may be added in the proportion of about 10 grams to a solution having the composition given above. The oxygen-containing gas again is passed through the reaction mixture to effect polymerization by oxidative coupling of the monomer. Passage of oxygen is continued until the desired degree of polymerization is effected.

After the desired degree of polymerization is reached, the polymerization reaction is terminated by discontinuing the supply of oxygen-containing gas to the reaction mixture. The pyridine then is removed from the reaction mixture. Removal may be carried out by distilling the pyridine from the reaction mixture. Alternatively, the pyridine can be removed by precipitation in the form of pyridine sulfate by adding sulfuric acid to the reaction mixture.

The polymerization of the 2,6-dialkyl phenol monomer can be carried out to effect, within limits, any desired degree of polymerization. For example, the polymerization can be carried out to effect polymerization such that the molecular weight of the polymer is as high as 150,000, i.e., contains about 1250 monomer units where the alkyl substituents are methyl groups. On the other hand, the polymerization can be carried out to produce a polymer having a lower molecular weight. For example, polymerization can be carried out such that the polymer has a molecular weight of about 28,000, i.e., contains about 230 monomer units in the case of the dimethyl polymer. Additionally, for example, the polymerization can be carried out to produce a polymer containing only 10 monomer units. In preparing film catalysts for use in the present invention, polymers containing about 230 monomer units have been found to be satisfactory. However, polymers having other degrees of polymerization can be used.

The degree of polymerization can be regulated by controlling the concentration of various of the components added to the reaction mixture. Control of the concentration of the cuprous chloride will control the degree of polymerization. For example, increasing the concentration of the cuprous chloride will effect an increase in the molecular weight of the polymer. Additionally, the degree of polymerization can be regulated by controlling the amount of the monomer added to the reaction mixture. Further, increase in the ratio of the amount of ligand, namely, the pyridine, to the amount of monomer added to the reaction mixture increases the degree of polymerization.

The degree of polymerization is not affected to any great extent by the type of oxygen-containing gas empolyed. It has been theorized that the polymerization of the monomer is brought about by an oxidative coupling. In any case, oxygen must be present in the reaction mixture during the polymerization reaction. The oxygen maintains the copper chloride in the cupric form, as mentioned before, and in accordance with the theory, effects the oxidative coupling. The oxygen-containing gas employed may be air or may consist entirely of oxygen.

Sulfonation of the polymer can be effected following removal of the pyridine from the reaction mixture. Sulfonation is carried out by adding a sulfonating agent to the reaction mixture. In carrying out the sulfonation reaction, any of the known sulfonating agents may be employed. For example, the reaction may be carried out by employing sulfuric acid, fuming sulfuric acid (oleum), chlorosulfonic acid, or sulfur trioxide. Preferably, chlorosulfonic acid is employed.

The sulfonation reaction proceeds until such time as the sulfonated polymer precipitates from the reaction mixture. Stated otherwise, precipitation of the sulfonated polymer terminates the sulfonation reaction. Thus, the sulfonated product will ordinarily be uniform under any given set of reaction conditions.

The sulfonation reaction does not appear to be temperature dependent. For example, the reaction may be carried out at room temperature or may be carried out at lower temperatures. Thus, the reaction may be carried out at temperatures of about 25° C. or may be carried out at temperatures as low as 0° C.

The sulfonation reaction, additionally, does not appear to be affected by pressure. Thus, satisfactory sulfonation is effected by carrying out the reaction at atmospheric pressure. In any case, from theoretical considerations, pressure should not affect the reaction to any great extent since the reaction mixture is a homogeneous liquid until precipitation of the sulfonated polymer is complete.

The time during which the sulfonation reaction is carried out is not of importance. As stated hereinabove, the reaction continues until such time that the sulfonated polymer precipitates. At this stage, the reaction terminates automatically.

The degree to which the polymer is sulfonated is susceptible to control. Sulfonation may be effected to obtain a degree of sulfonation of 1.0. Stated otherwise, the sulfonation can be controlled such that each unit of monomer in the polymer contains one sulfonic acid ($SO_3H$) group. The sulfonation may also be effected to obtain a degree of sulfonation between about 0.01 and 1.0 although, for reasons explained hereinafter, a degree of sulfonation of at least about 0.25 is preferred for polymers utilized in preparing film catalysts for use in the present invention. Generally, the degree of sulfonation is controlled by proportioning the amount of sulfonating agent with respect to the amount of polymer in the reaction mixture. Thus, higher degrees of sulfonation are obtained by increasing the ratio of the amount of sulfonating agent and polymerized 2,6-dialkyl phenol in the reaction mixture. On the other hand, the reaction is not stoichiometric and, accordingly, the degree of sulfonation will not correspond precisely to the molecular ratio of sulfonating agent and polymer. Preferably, the sulfonating agent is employed in an amount twice the stoichiometric amount for any given degree of sulfonation. Where the desired degree of sulfonation is about 0.6, i.e., on the order of about two sulfonation groups for about three monomer units of the polymer, satisfactory results are obtained employing twice the stoichiometric amount of sulfonating agent.

Returning now to the description of the present invention, the film 19 of reaction chamber 16 (FIGURE 2) may be formed by drying a solution of the sulfonated poly (2,6-dialkyl phenol) on the interior wall of the tubular member 18. The solute charatceristics of the polymer vary according to the degree of sulfonation and the molecular weight, with a low degree of sulfonation and, to a lesser extent, a low molecular weight tending to make the polymer oil-soluble. For example, where the degree of sulfonation is about 0.1, i.e., about one sulfonic acid group to ten dialkyl phenol monomer groups, and the polymer contains on the order of about 10 to 20 monomer groups, the polymer is oil-soluble. Conversely, where the degree of sulfonation is on the order of about 0.25, the sulfonated polymer is water-soluble even at relatively low molecular weights. Since it is preferred to form the film or membrane of a polymer having a relatively high degree of sulfonation, an aqueous solution of the polymer is used.

One procedure for drying a film of the polymer on the interior wall of member 18 is as follows. The tubular member is placed in a furnace held a suitable temperature, e.g., 80° C., and canted at a slight angle from the horizontal. An aqueous solution of sulfonated poly (2,6-dialkyl phenol) is introduced into the tube through the upper end thereof while air is blown through the tube from the other end. During this time the pipe is rotated so that a film of dried sulfonated poly (2,6-dialkyl phenol) is formed on the interior of the pipe. This procedure is continued until a film of the desired thickness is built up. While the thickness of the film is not critical, it usually will be preferred to build up a film having a thickness of at least 20 microns. After the dried film is formed, heating is continued preferably for a period of one-half hour or more in order to make the film water-insoluble.

The polymer film can be formed by other procedures such as by molding. For example, in the reaction chamber shown in FIGURE 3, the lining 23 and membrane 24 may be formed integrally by the use of suitable interior molds. Alternatively, the lining 23 may be formed as described in the preceding paragraph and the membrane may be made separately and held in place within the reaction chamber by means of a suitable joint (not shown) in the tubular member 22.

It may be desirable in some cases to form the lining in the reaction chamber of an expanded or foamed film of sulfonated poly (2,6-dialkyl phenol) in order to give a greater surface area for the catalysts reaction. This may be accomplished by any suitable technique, for example, by bubbling air through the polymer solution as it is drying.

As has been noted previously, the membrane or film is formed of a sulfonated poly (2,6-dialkyl phenol) in which the alkyl groups are methyl, ethyl, or n-propyl groups. However, it is preferred to form the membrane or film of sulfonated poly (2,6-dimethyl phenol) since the parent poly (2,6-dimethyl phenol) is more easily obtained than the other polymers. The polymerization of dialkyl phenols containing ethyl or n-propyl groups is retarded by steric hindrance which increases progressively with the lengths of the alkyl side chains. Steric hindrance is at a minimum in the polymerization of 2,6-dimethyl phenol.

The sulfonated poly(2,6-dialkyl phenol) membrane or film has a relatively high degree of flexibility and strength, and is permeable to water and insoluble in water and organic solvents such as methanol, methyl acetate, etc., as well as other common organic and inorganic solvents. The membrane acts like a strong acid even though it is insoluble in water and can be titrated as described hereinafter. While we do not wish to be bound by any particular theory, it is believed that the membrane results from the sulfonated poly (2,6-dialkyl phenol) undergoing sulfone cross-linking of a portion of the sulfonic acid groups during the heating step. The structure of the cross-linked polymer is indicated by the following general formula:

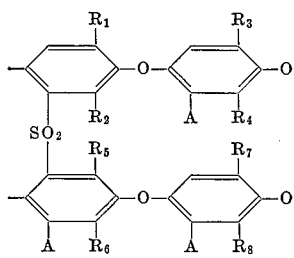

wherein $R_1$–$R_8$ are methyl, ethyl, or n-propyl groups and A is either hydrogen or a sulfonic acid group. The acidic nature of the membrane is due to the remaining sulfonic acid groups which have not been converted to sulfone groups. That is, the acid character of the membrane results from the sulfonic acid groups in which the $H^+$ cations are dissociable to a high degree from the —$SO_3^-$ anions. The —$SO_3^-$ ions are chemically bonded to the polymeric matrix in relatively fixed positions on the polymer structure, but the $H^+$ ions are highly mobile and free to move within the polymer network or an adjacent water phase, subject to the requirements of electrical neutrality. The migration of $H^+$ ions into the adjacent water phase leaves an excess of —$SO_3^-$ ions within the polymer network. This builds up a negative charge within the membrane which tends to repel negatively charged particles and gives the membrane its permselective character, i.e., the ability to selectively pass cations while selectively restricting the passage of anions.

Since the ionic properties of the membrane or film, from the standpoint of both acidity and permselectivity, depend upon the number of sulfonic acid groups in the polymer network, it will be recognized that the sulfonated poly (2,6-dialkyl phenol) precursor from which the membrane is prepared should have a relatively high degree of sulfonation in order to provide sufficient sulfone groups for cross-linking and still leave an adequate number of functional sulfonic acid groups. In most cases, therefore, the precursor should have a degree of sulfonation of at least 0.25. Sulfonated poly (2,6-dialkyl phenol) membranes are disclosed in U.S. patent application Ser. No. 439,456 of Paul E. Blatz filed of even date herewith to which reference is made for a more detailed description of such membranes and their method of preparation.

By way of illustration to those skilled in the art, the following example of the acidity of the polymer membrane is given. An aqueous solution of about 0.3 percent by weight of sulfonated poly (2,6-dimethyl phenol) was placed in a glass beaker. The weight of the polymer solution was 50.639 grams. The polymer contained about 230 dimethyl phenol monomer units and had a sulfonation ratio of about two sulfonic acid groups to three dimethyl phenol monomer units. The beaker was placed in an oven and heated at 110° C. until from a visual inspection it appeared to be dry. Thereafter, the polymer film was heated for twenty minutes at a temperature of 110° C. After the heating step, the beaker was withdrawn and the polymer film was found to weigh 0.158 gram. An attempt was made to dissolve the film in distilled water at room temperature and also at a temperature of about 100° C. The polymer film was found to be water-insoluble. The beaker then was filled with distilled water to bring the weight of the film and water to 50.639 grams and the film was titrated with 0.1 normal sodium hydroxide. The results of the titration are shown in FIGURE 5 in which the pH is plotted as the ordinate and the volume of sodium hydroxide is plotted as the abscissa. From FIGURE 5, it can be readily seen that the sulfonated poly (2,6-dialkyl phenol) membrane or film acts like a strong acid.

Having described certain specific embodiments of the present invention, it will be understood that various other modifications may be suggested to those skilled in the art, and it is intended to cover all such modifications as fall within the scope of the appended claims.

What is claimed is:

1. In a method of carrying out an esterification reaction between a carboxylic acid and an alcohol, which reaction is subject to catalysis by a sulfonic acid group; the improvement which comprises flowing said acid and alcohol into a reaction chamber defined at least in part by a permeable membrane of sulfonated poly (2,6-dialkyl phenol) wherein the alkyl groups are selected from the class consisting of methyl, ethyl, and n-propyl groups, contacting said membrane with said acid and alcohol to effect catalysis of said reaction, and establishing a pressure gradient across said membrane from the interior of said reaction chamber to the exterior thereof whereby unreacted acid is selectively restricted from passage through said membrane and unreacted alcohol and the ester and water produced by said reactants are selectively passed through said membrane.

2. The method of claim 1 wherein said alkyl groups are methyl groups.

3. In a method of carrying out an esterification reaction between a carboxylic acid and an alcohol, which reaction is subject to catalysis by a sulfonic acid group; the improvement which comprises flowing said acid and alcohol into a chamber having disposed therein a transverse, permeable membrane of sulfonated poly (2,6-dialkyl phenol) wherein the alkyl groups are selected from the class consisting of methyl, ethyl, and n-propyl groups, contacting said membrane with said acid and alcohol to effect catalysis of said reaction, and establishing a pressure gradient across said membrane from the upstream side of said membrane to the downstream side thereof whereby said acid is selectively restricted from passage through said membrane and unreacted alcohol and the ester and water produced by said reaction are selectively passed through said membrane.

4. The method of claim 3 wherein said alkyl groups are methyl groups.

5. In a method of carrying out an esterification reaction between a carboxylic acid and an alcohol, which reaction is subject to catalysis by a sulfonic acid group; the improvement which comprises flowing said acid and alcohol into a chamber defined at least in part by a permeable membrane of sulfonated poly (2,6-dialkyl phenol) wherein the alkyl groups are selected from the class consisting of methyl, ethyl, and n-propyl groups, traversing the surface of said membrane with said acid and alcohol whereby they react to produce an ester and water, and establishing a pressure gradient across said membrane from the interior of said chamber to the exterior thereof whereby unreacted acid is selectively restricted from passage through said membrane and unreacted alcohol and said ester and water are selectively passed through said membrane.

6. The method of claim 5 wherein said alkyl groups are methyl groups.

References Cited

UNITED STATES PATENTS 3,182,043  5/1965  Kirkland _____ 260—541
3,259,592  7/1966  Fox et al. _____ 260—49

OTHER REFERENCES

Sussman, Industrial and Engineering Chemistry, vol. 38, No. 12, December 1946, pp. 1228–1230.

Osborn, Synthetic Ion-Exchangers, 1961, pp. 81–95.

JAMES A. PATTEN, Primary Examiner

V. GARNER, Assistant Examiner

U.S. Cl. X.R.

260—49, 2.2, 488, 478, 469